US006327048B1

(12) United States Patent
Wen

(10) Patent No.: US 6,327,048 B1
(45) Date of Patent: Dec. 4, 2001

(54) ORGANIZING AND PRODUCING A DISPLAY OF IMAGES AND LABELS ON A RECEIVER

(75) Inventor: Xin Wen, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/102,954

(22) Filed: Jun. 23, 1998

(51) Int. Cl.[7] ............................ B41B 15/00; B41J 2/435; B41J 5/30; G01D 15/14

(52) U.S. Cl. ......................... 358/1.18; 358/1.17; 358/1.1; 347/224; 400/61; 400/68

(58) Field of Search .............................. 347/224; 400/61, 400/68; 358/1.18, 1.17, 1.1

(56) References Cited

U.S. PATENT DOCUMENTS 4,718,784 * 1/1988 Drisko .................................... 400/68

5,915,858 * 6/1999 Wen ....................................... 400/61

* cited by examiner

*Primary Examiner*—Edward Coles
*Assistant Examiner*—Twyler Lamb
(74) *Attorney, Agent, or Firm*—Raymond L. Owens; Stephen H. Shaw

(57) ABSTRACT

A method for organizing and producing a display of images and labels on a receiver including storing information corresponding to images to be displayed which includes the desired size of the images to be displayed and selecting labels having information which annotates the images to be displayed. The method further includes organizing the labels and the images to a desired layout pattern having location and organization information and storing such layout; printing the information on the labels with each label having an adhesive backing; and providing the labels and the images on the receiver in accordance with the layout pattern.

11 Claims, 3 Drawing Sheets

ORGANIZING AND PRODUCING A DISPLAY OF IMAGES AND LABELS ON A RECEIVER

FIELD OF THE INVENTION

The present invention relates to displaying and annotating images. More specifically, the present invention relates to organizing and producing a display of images and labels on a receiver.

BACKGROUND OF THE INVENTION

Photographic print is a very popular method for people to display images of past experience and share memories with other people in their lives. Photographs are commonly stored in album books. The photographs in the album books are often sorted according to the date and events. For example, 0photographs taken during a trip to Florida, in certain date, may be stored in adjacent pages in a album.

There are, however, several long felt needs associated albums. First, it is often desired to provide labels to annotate the pictures in the albums. The annotation may include the time, date, location, experience etc. associated with the photographs. Some people use hand-written Post-It to label the photos in albums but they look untidy and unprofessional. Furthermore, many albums such as the ones containing plastic pocket sleeves do not have space for placing these labels. Second, it is difficult to arrange photographs in the albums. If one photograph needs to be inserted or taken out, many photographs in the album need to be reshuffled.

SUMMARY OF THE INVENTION

An object of this invention is to provide a method for organizing images and labels on a receiver.

Another object of this invention is to provide a plurality of receivers which correspond to a traditional album.

Another object of the present invention is to provide a method for arranging image such as photographs and labels in a desired layout.

These objects are achieved by a method for organizing and producing a display of images and labels on a receiver, comprising the steps of:

a) storing information corresponding to images to be displayed which includes the desired size of the images to be displayed;

b) selecting labels having information which annotates the images to be displayed;

c) organizing the labels and the images to a desired layout pattern having location and organization information and storing such layout;

d) printing the information on the labels with each label having an adhesive backing; and e) providing the labels and the images on the receiver in accordance with the layout pattern.

ADVANTAGES

One advantage of the present invention is that the annotation labels for the photographs on the album can be printed by a digital printer and therefore are more aesthetically appealing.

Another advantage of the invention is that the layout of the photographs and the labels can be conveniently organized with the assistance of computer software according to individual user's desires.

A further advantage of the present invention is that the labels for annotating the photographs in the displays are self-adhesive and can be easily placed on the display as well as re-arranged.

Still a further advantage of the present invention is that the layout for the photographs and the labels can be printed for an album or display.

DETAILED DESCRIPTION OF THE INVENTION

Figure 1:
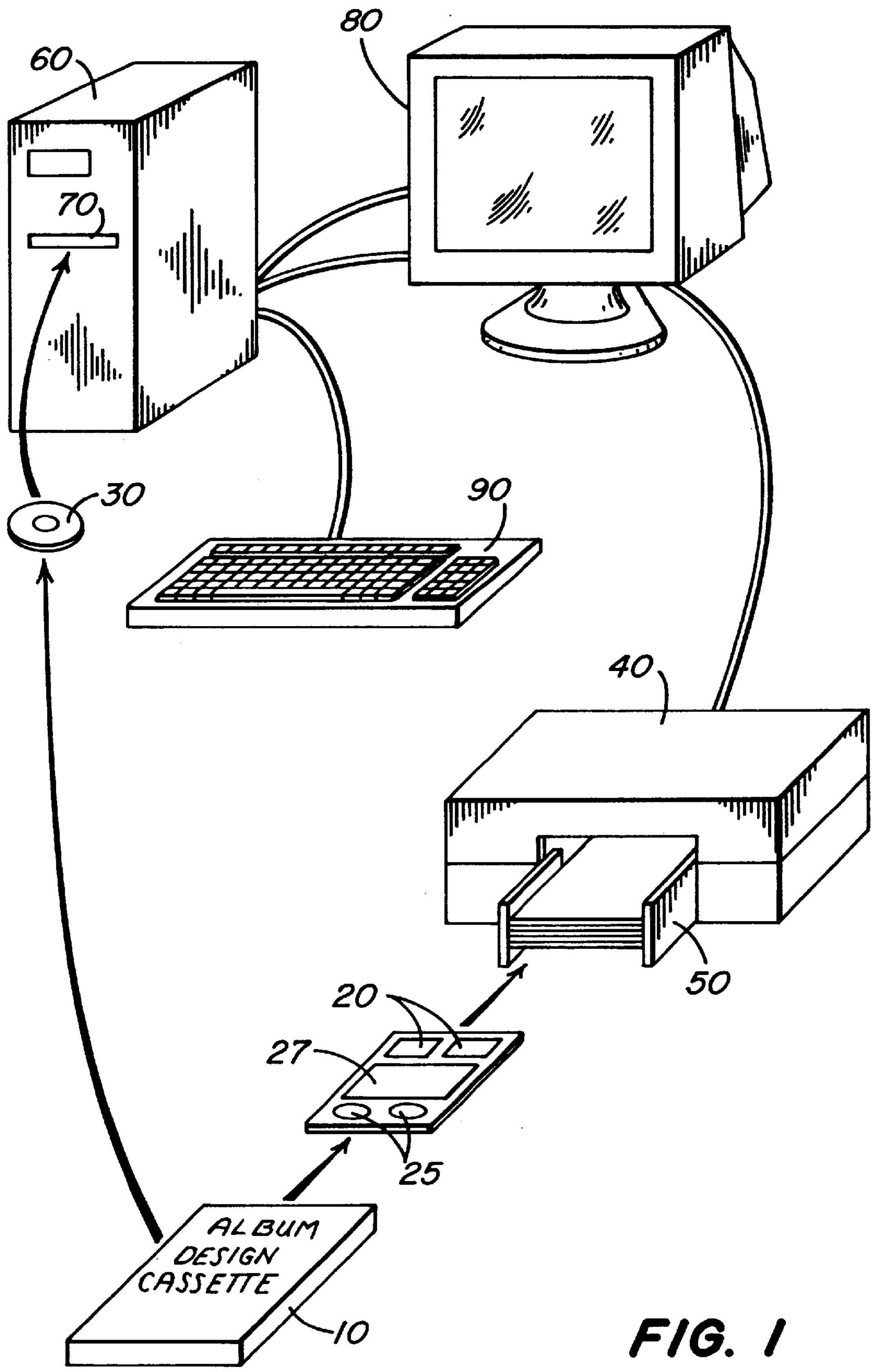
FIG. 1 is a perspective view a computer, a printer, and the album made in accordance with the present invention for organizing and producing a display for images and annotation labels in accordance with the present invention.

Referring to FIG. 1, an album design cassette 10 in accordance with the present invention includes self-adhesive labels 20 and computer software 30. The computer software 30 can be contained on a CD-ROM, magnetic disk, and can also be downloaded from a Web Site on the Internet. The self-adhesive labels 20 are shown to be carried as preformed (pre-cut or perforated) stickers on a carrier sheet 25. The carrier sheet 25 can also carry a digital image label 27 on which digital photographic images can be printed. The equipment for the album design cassette 10 includes a printer 40 having a paper tray 50, a computer 60 with a CD drive 70, a monitor 80 and a keyboard 90. Although not shown in FIG. 1, the computer 60 also includes communication ports with the Internet or a digital camera. The carrier sheet 25 carrying the self-adhesive labels can be loaded into the paper tray 50 in the printer 40. Text and images can be printed on the self-adhesive labels by the printer 40 under the control of the computer 60.

Figure 2:
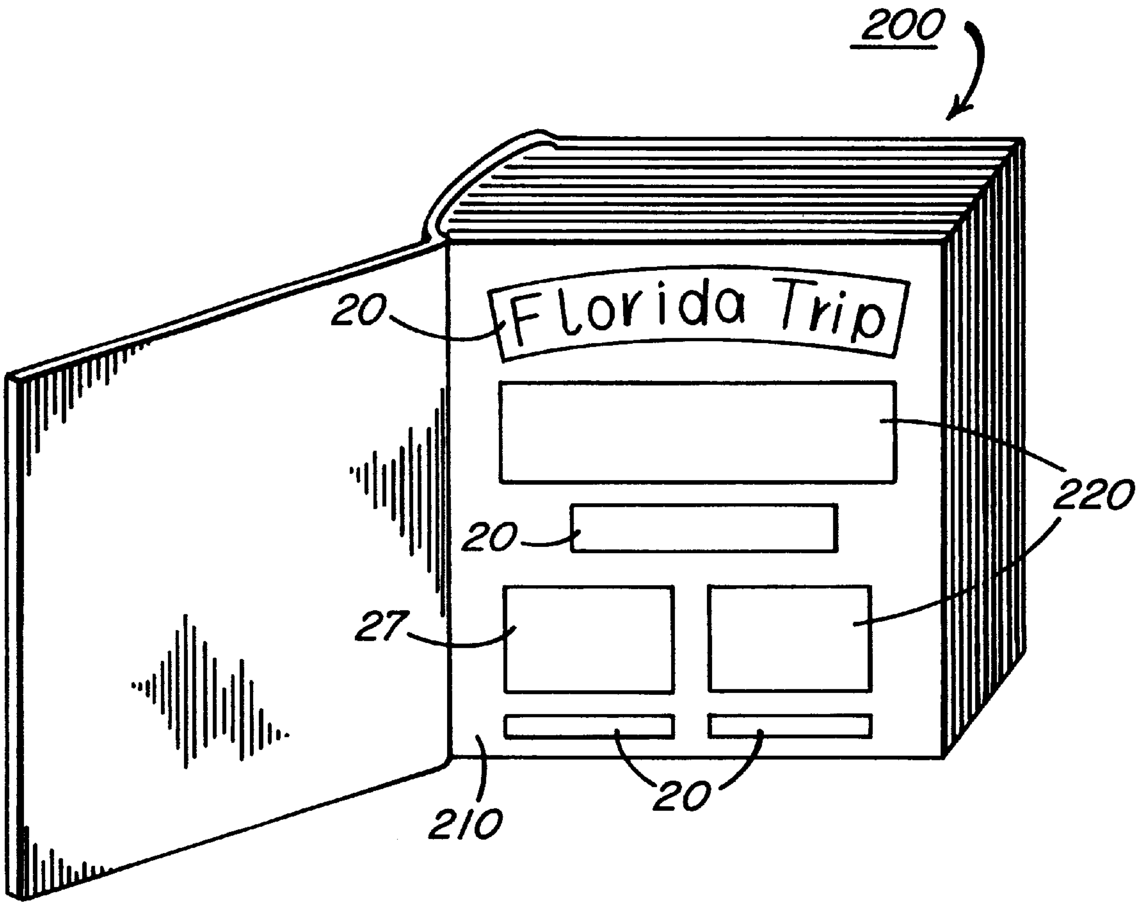
FIG. 2 shows an album with images and labels produced in accordance with the present invention.

FIG. 2 shows a album 200 in accordance with the present invention. The album 200 includes a plurality of receivers 210 that are compatible with the self-adhesive labels 20 and digital image label 27. Several images 220 are adhered to the receiver 210 in the album 200. The images 220 can be photographs printed by a chemical process on photosensitive materials such as silver halide emulsions. The images 220 can also be printed on digital image label 27 by a digital printer such as an ink jet printer or a thermal dye diffusion printer. Several commercial printers can be used in the present invention. Examples of these printers include Kodak XLS 8650 printer, HP PhotoSmart, and Epson Photo Stylus printers. The images 220 can exist in many different sizes (such as 2R, 3R, 4R etc.) and formats (such as APS, panoramic, HDTV formats). The images 220 can be continuous tone as in an photograph, or halftoned to simulate photographic quality. The images 220 can be both colored or monochromatic (normally black and white).

In a preferred embodiment of the present invention, the self-adhesive labels 20 can be adhered to and removed from the receiver 210 multiple times for easy re-arrangement of the photographs and the labels. It is understood that the album in the present invention can also include single-sheet displays that can be hung a wall surface or displayed in a frame.

The album 200 also includes self-adhesive labels 20 that carry the annotation to the images 220. For example, a title in FIG. 2 shows that the group of images 220 was all taken, for example, on a vacation trip. Individual photographs can also be annotated with stories specific to the experience associated with that particular photograph.

In accordance with another embodiment of the present invention, the layout for the display is directly printed on the receiver 210 by a digital printer. The layout information can include the location, the borders and the sizes of the images, the annotation label information (including titles) to each sheet of receiver, and the design pattern in the background on the receiver. If the images are input digitally, the digital images can also be printed together with the background. In this embodiment, no self-adhesive backings are necessary for the images or labels. The receiver with the printed images and labels can be used for a single-sheet display or be bound into an album 82 in a book form.

Figure 3:
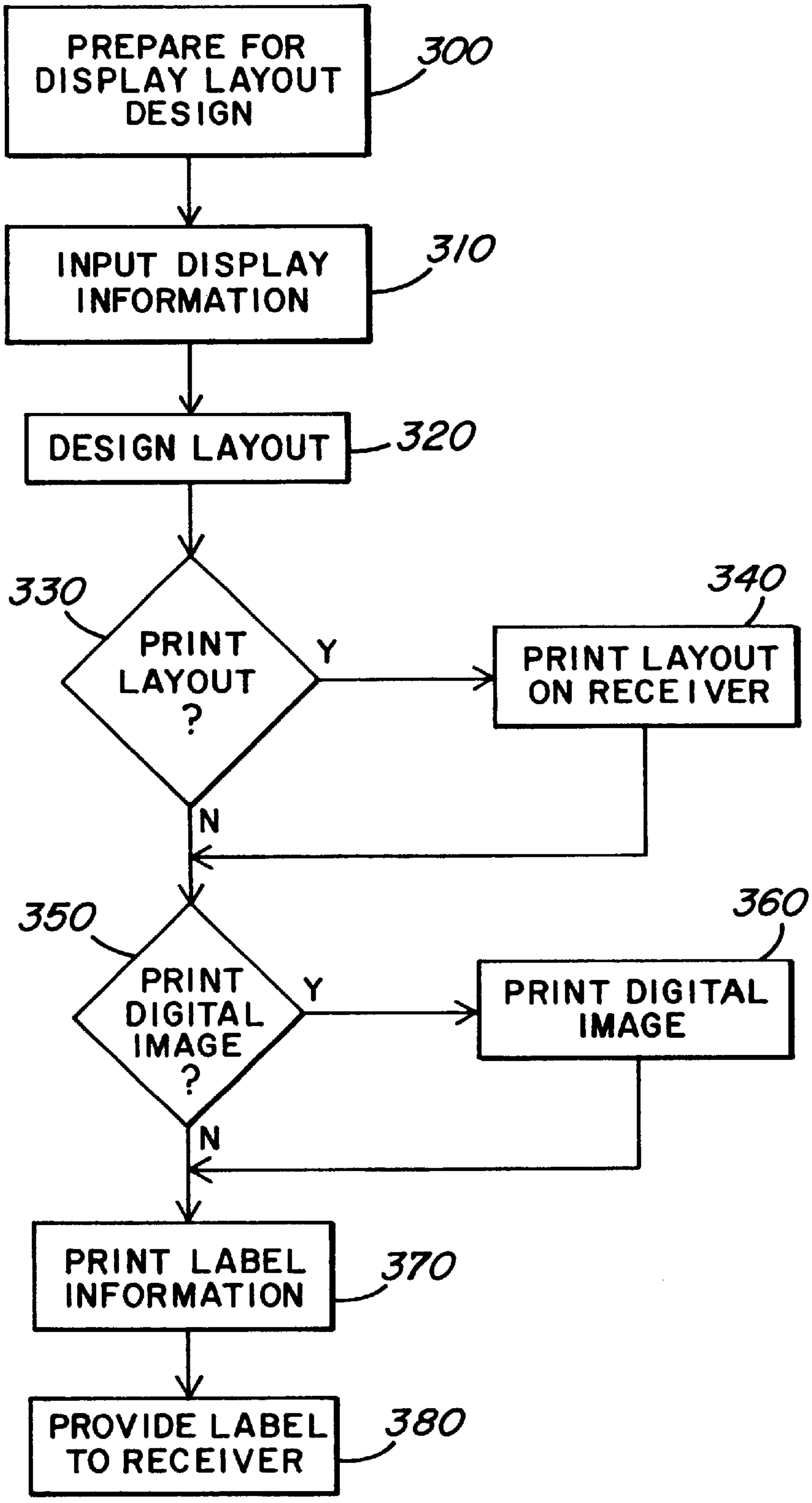
FIG. 3 is a flow chart of the procedure in accordance with the present invention for organizing and producing a display including images and labels.

Referring to FIG. 3, a typical customer uses the album design cassette 10 in the following procedure. First, in block 300, the customer prepares for designing the layout for the display. The customers acquires an album design cassette 10 and a album 200 that is compatible with the self-adhesive labels 20, digital image label 27, and images 220. The customer can have several photographs with self-adhesive backing taken from a past event such as a trip or graduation. The computer software 30 is loaded onto a computer 60 from a storage device such as a CD or from a Web Site on the Internet provided by the manufacturer. By using the computer software, the customer can visualize the layout the layout for the images 220 and associated label information on a computer monitor 80.

Next, in block 310, the customer inputs information related to the display using the keyboard 90. The information may include the sizes (i.e. 2R, 3R, 4R etc.) of the photographs the customer wants to display on the receiver 210 and the text for the label information. Digital images can also be loaded to the computer 60 from a digital camera, a Photo CD, a Picture CD and so on.

In block 330, the customer organizes the positions for the images 220 and associated label information to be displayed on the receiver 220. Colors and graphics patterns can also be organized for each self-adhesive label and the background. The digital images can be processed by typical image processing steps such as cropping, resizing, rotation, color and tone calibration, sharpening, halftoning, etc.

Next in block 330, a question is asked whether the customer likes to print the layout? If the answer is Yes, the layout for the display is printed on the receiver for the display. If the answer to block 330 is No, a second question is asked in block 350 whether the customer needs to print digital image? If the answer to block 350 is Yes, digital image will be printed in block 360 on digital image label 27 on a carrier sheet 25 or directly on the receiver 210.

If the answer to block 350 is No, the carrier sheet 25 is loaded in the paper tray 50 in the printer. The label information is printed by the printer 40 on the self-adhesive label 20 on the carrier sheet. Finally, in block 380, the self-adhesive label 20 and the digital image label 27 are removed from the carrier sheet 25. The customer positions the images 220, the self-adhesive label 20, and the digital image label 27 on the receiver 210. As a preferred embodiment in the present invention, the images 220, the self-adhesive label 20, and the digital image label 27 can be removed and adhered again to the receiver 210 a multiple times for re-design of the layout. A plurality of receivers 210 carrying the display images 220 and printed label information can be bound together into an album 200.

The present invention therefore provides a personalized album or display emphasizing the personal feelings and impressions associated with people's memories. The album can be displayed on a coffee table or sent as a gift to family members or friends. The display can be hung on a wall or on a refrigerator door. The photographs and the annotation labels on the display can be easily removed. The receiver 210 can be re-used for a new display.

The invention has been described in detail with particular reference to certain preferred embodiments thereof, but it will be understood that variations and modifications can be effected within the spirit and scope of the invention.

PARTS LIST

10 album design cassette
20 self-adhesive labels
25 carrier sheet
27 digital image label
30 computer software
40 printer
50 paper tray
60 computer
70 CD drive
80 monitor
90 keyboard
200 album
210 receiver
220 images
300 block
310 block
330 block
350 block
360 block
380 block

What is claimed is:

1. A method for organizing and producing a display of images and labels on a receiver, comprising the steps of:

a) storing information corresponding to images to be displayed which includes the desired size of the images to be displayed;

b) selecting labels having information which annotates the images to be displayed;

c) organizing the labels and the images to a desired layout pattern having location and organization information and storing such layout;

d) printing the information on the labels with each label having an adhesive backing; and e) providing the labels and the images on the receiver in accordance with the layout pattern.

2. The method of claim 1 wherein digital images are stored and wherein organizing such digital images can include image processing such as cropping, rotation, resizing, sharpening, tone and color transformation, halftoning.

3. The method of claim 2 wherein the size of the labels can be changed during the organizing step.

4. The method of claim 1 wherein the images are digital images and are stored and further including the step of printing the digital images and the label information on a receiver in accordance with the layout pattern.

5. The method of claim 1 wherein the labels are printed by a digital printer.

6. The method of claim 1 wherein the labels can be removed from the receiver and repositioned in different locations on the receiver.

7. The method of claim 1 wherein the size and content of the labels is selected by a user.

8. The method of claim 1 further including storing a plurality of labels and selecting the desired labels to be used wherein the self-adhesive labels are provided as stickers on a carrier sheet.

9. The method of claim 1 wherein the labels are provided as pre-formed stickers on a carrier sheet.

10. A method for organizing and producing a display of images and labels on a receiver, comprising the steps of:

a) storing information corresponding to images to be displayed which includes the desired size of the images to be displayed;

b) selecting labels having information which annotates the images to be displayed;

c) organizing the labels and the images to a desired layout pattern having location and organization information and storing such layout;

d) printing the layout pattern and the label information associated with the images on the receiver; and e) providing the images on the receiver in accordance with the printed layout on the receiver.

11. A method for organizing and producing a display of images and labels on a receiver, comprising the steps of:

a) storing information corresponding to images to be displayed which includes the desired size of the images to be displayed;

b) selecting labels having information which annotates the images to be displayed;

c) organizing the labels and the images to a desired layout pattern having location and organization information and storing such layout;

d) printing the layout pattern on the receiver;

e) printing the information on the labels with each label having an adhesive backing; and f) providing the labels and the images on the receiver in accordance with the printed layout on the receiver.

* * * * *